Patented Nov. 22, 1949

2,489,246

UNITED STATES PATENT OFFICE 2,489,246

SYNTHETIC RUTILE AND METHOD OF MAKING SAME

Eugene Wainer, Niagara Falls, N. Y., assignor, by mesne assignments, to National Lead Company, New York, N. Y., a corporation of New Jersey No Drawing. Application June 9, 1943, Serial No. 490,227

3 Claims. (Cl. 23—202)

1

The present invention relates to the manufacture of synthetic rutile and more particularly to a method of manufacturing rutile synthetically wherein an end product of uniform electrical properties may be prepared repeatedly.

Heretofore it has been suggested that rutile for use in electrical insulation, and particularly as a dielectric, be prepared by extended calcination of pigment grades of titanium dioxide at temperatures within the range 1250° C. to 1400° C. The raw product invariably used for this purpose is the stable form of titanium dioxide anatase of a particle size of 0.2 micron to 0.3 micron. Upon extended calcination within the temperature range specified, a well-developed crystalline form of rutile is obtained.

However, the results of this process are not satisfactory due to the fact that in most instances wherein pigment grade titanium dioxide is calcined it results in the production of a product which is completely useless as an electric insulator or dielectric. The ceramic ware made from such calcined titanium dioxide, has in many instances, particularly in pieces of relatively thick cross-section, segregated portions having dark centers and blue specking. The electrical properties of ceramic articles of this type are such as to render the article useless for the specific purpose for which it was manufactured. Resistance to voltage breakdown is one-half to one-quarter of the proper value, dielectric constants vary between 80 and 100, power factors are 10 to 100 times higher than that obtained from properly prepared synthetic rutiles, resistances are as low as $1 \times 10^5$ ohm cm. and temperature coefficients are beyond the permissible limits.

It is an object of the present invention to provide a controlled method for the production of synthetic rutile wherein a ceramic of uniform electric characteristics can be prepared in repeated batches.

It is an object of the present invention to prepare synthetic rutile from pigment grade titanium dioxide and obtain a crystalline rutile form of titanium dioxide from which ceramic ware of uniform electrical properties may be prepared.

In accordance with the present invention the addition of aluminum oxide in small amounts to the pigment grade of titanium dioxide and the calcination of this mixture at a temperature of from 1200° C. to 1400° C. produces synthetic rutile of desired uniform quality and grade. The calcination is continued until the rutile crystals developed in the calcination have a size range between 1.0 micron to 2.0 microns.

2

In general, pigment grade titanium dioxide of the crystal form of anatase is employed as the raw material. In general the product selected is one having a titanium dioxide content of at least 98%.

In general the invention is practiced by adding sufficient of a soluble salt of aluminum oxide to the pigment grade titanium dioxide so that from 0.1% to 0.3% aluminum oxide has been incorporated therewith. The oxides or hydrates themselves may be used to accomplish this purpose although it may be preferred to add the aluminum oxide through the medium of a soluble salt of aluminum, employing any salt which yields the oxide on calcination at temperatures below about 1200° C. Thus, the sulfate, nitrate or acetate are well suited for this purpose.

Incorporation of the aluminum oxide in the titanium oxide of pigment grade may be performed suitably by making a slurry of titanium oxide consisting of three parts of water to one part of the oxide. Sufficient aluminum sulfate in crystalline form is added to the slurry to yield an aluminum oxide content of 0.1% to 0.3% based on the titania content. After stirring the mixture for a short time to insure complete dispersion of the soluble salt, the slurry is brought to a pH of 6 to 7 with ammonia. The slurry is thereafter dewatered by direct evaporation of the water content or the slurry may be first filtered and then dewatered. After drying, the residue is calcined for at least six hours at 1250° C. or for such length of time as is required to produce rutile crystals of 1 to 2 microns in length. In general the calcination requires between about six to twelve hours. The product so produced is creamy white in color, free of reduced titania. The product is completely free of any dark shading and is free of lumps which interfere with subsequent processing.

In contrast with the calcination of pigment grade titanium dioxide in the absence of aluminum oxide, no darkening in the furnace is apparent nor do small segregated areas form, producing lumping in the furnace as is the usual operation in the absence of aluminum oxide. Under the microscope the ultimate product of the present invention shows the characteristic crystal structure of rutile in which the crystals are well-developed and well-defined.

The ceramic produced by the present invention possesses definite electrical properties or characteristics falling within a definite range, namely a dielectric constant of 100 or more and a power factor of 0.1% or less measured at one megacycle;

a resistivity of $5 \times 10^{12}$ ohm-cm. or more at room temperature. The product of the present invention possesses a negative temperature coefficient of capacity and power factor determined at one megacycle within the following ranges: a drop of approximately 10 units of dielectric constant over the temperature range 20° C. to 150° C., an increase in power factor of no more than 100% in the same temperature range, the dielectric constant variation being essentially a straight line curve.

The following experiments were performed with titanium dioxide of the crystal form of anatase and having a particle size of 0.2 micron to 0.3 micron by calcining for eight hours at 1250° C.:

| | | | |
|---|---|---|---|
| $TiO_2$ | 98.50 | $ZrO_2$ | 0.01 |
| $Al_2O_3$ | 0.04 | $CaO$ | 0.15 |
| $SiO_2$ | 0.50 | $MgO$ | 0.03 |
| $Fe_2O_3$ | 0.01 | $Sb_2O_3$ | 0.02 |

*Example*

A 1000 gram sample of the above product was calcined and it was noticed that a short time after furnacing, the product began to darken which discoloration became progressively worse as calcination continued. Small lumps formed in the hot charge. The cold calcine was dark grey in color which color was particularly pronounced in the small lumps. These lumps were extremely tough and hard and required an excessive amount of milling to reduce them to useable size. Under the microscope the crystal structure of this dark grey calcine was poorly developed and ill-defined.

A test of the electrical properties of the ceramic produced therefrom gave results not within the range set out above.

Another 1000 gram sample of the composition set forth above was mixed with 3000 ml. of water and stirred. Nine grams of aluminum sulfate were added and stirred in for ten minutes. The slurry was then brought to a pH of 6.0 to 6.5 with ammonia. The slurry was dewatered for filtration and dried and then calcined for eight hours at 1250° C. During furnacing no lumping or grey spots were observed and the end product was creamy white, free of dark spots and lumps of segregated material. The electrical properties of the ceramic made therefrom fell within the range set forth above.

Aluminum oxide may be incorporated with a material to be calcined by the use of what may be called a master batch. That is to say, synthetic rutile may be prepared containing up to 10% or more of aluminum oxide and a quantity of this material added to the pigment grade titanium dioxide and the whole calcined as outlined above. The amount of the aluminum oxide-carrying titanium dioxide added should be sufficient to bring the additive aluminum oxide from 0.1% to 0.3%.

From the foregoing it will be apparent that the present invention provides a method whereby synthetic rutile having uniform electrical properties may be repeatedly prepared. It will be understood that the above examples are given merely by way of illustration and not to define the scope of the invention, the invention being limited only by the claims appended hereto.

What is claimed is:

1. The method of preparing condenser dielectric material from titanium dioxide, the crystal structure of which does not correspond with that of rutile, which comprises heating the dioxide at a temperature above 1200° C. in the presence of 0.1% to 0.3% of aluminum oxide based on the weight of titanium dioxide until the crystal size is in the range 1 to 2 microns.

2. Condenser dielectric material consisting of rutile crystals of a size in the range 1 to 2 microns and containing 0.1% to 0.3% of added aluminum oxide based on the weight of the titanium dioxide.

3. Condenser dielectric material consisting of rutile crystals of a size in the range 1 to 2 microns and containing 0.1% to 0.3% of co-calcined aluminum oxide based on the weight of the titanium dioxide.

EUGENE WAINER.

REFERENCES CITED

The following references are of record in the file of this patent:

UNITED STATES PATENTS

| Number | Name | Date |
|---|---|---|
| 2,071,452 | Bloch | Feb. 23, 1937 |
| 2,272,331 | Schupp | Feb. 10, 1942 |
| 2,286,832 | Von Bichowsky | June 16, 1942 |
| 2,339,003 | De Boer et al. | Jan. 11, 1944 |
| 2,360,479 | Detrick et al. | Oct. 17, 1944 |

FOREIGN PATENTS

| Number | Country | Date |
|---|---|---|
| 517,742 | Great Britain | Feb. 7, 1940 |